US012671746B2

(12) United States Patent (10) Patent No.: US 12,671,746 B2
Karim et al. (45) **Date of Patent: \*Jun. 30, 2026**

(54) COMPUTING SYSTEM IMPLEMENTING LOCAL CONTEXT RESOLUTION AND EVALUATION FOR NETWORK LATENCY REDUCTION

(71) Applicant: Uber Technologies, Inc., San Francisco, CA (US)

(72) Inventors: Khalid Karim, San Francisco, CA (US); Egor Gryaznov, San Francisco, CA (US); Yunke Tang, San Francisco, CA (US)

(73) Assignee: Uber Technologies, Inc., San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/213,092

(22) Filed: Jun. 22, 2023

(65) Prior Publication Data

US 2023/0336633 A1 Oct. 19, 2023

Related U.S. Application Data

(63) Continuation of application No. 17/115,239, filed on Dec. 8, 2020, now Pat. No. 11,743,345, which is a continuation of application No. 16/393,795, filed on Apr. 24, 2019, now Pat. No. 10,887,426.

(51) Int. Cl.
| | |
|---|---|
| *H04L 67/306* | (2022.01) |
| *H04L 67/50* | (2022.01) |
| *H04L 67/51* | (2022.01) |
| *H04L 67/61* | (2022.01) |
| *H04L 67/63* | (2022.01) |

(52) U.S. Cl.
CPC ............ *H04L 67/306* (2013.01); *H04L 67/51* (2022.05); *H04L 67/535* (2022.05); *H04L 67/61* (2022.05); *H04L 67/63* (2022.05)

(58) Field of Classification Search
CPC ....... H04L 67/306; H04L 67/51; H04L 67/61; H04L 67/63; H04L 67/535
See application file for complete search history.

(56) References Cited

U.S. PATENT DOCUMENTS

| | | | | |
|---|---|---|---|---|
| 9,551,586 | B2 * | 1/2017 | Guo | G01S 19/01 |
| 9,898,759 | B2 | 2/2018 | Khoury | |
| 9,906,899 | B2 * | 2/2018 | Flinn | H04L 51/04 |
| 10,033,775 | B2 * | 7/2018 | Chan | G06Q 30/0271 |
| 10,326,535 | B2 | 6/2019 | Sample | |
| 10,575,123 | B1 * | 2/2020 | Warr | H04W 4/021 |

(Continued)

*Primary Examiner* — Dhairya A Patel
(74) *Attorney, Agent, or Firm* — Mahamedi IP Law LLP

(57) ABSTRACT

A computing system can detect, based on data received via the network communication interface, a launch of a service application on a computing device of a user to initiate an application session. During the application session, the system can obtain contextual data corresponding to user interactions with the service application by the user. Based on the contextual data, the system can perform at least one of (i) acquire first additional user data corresponding to the user from one or more local data sources, or (ii) derive second additional user data associated with the contextual data to avoid a network call and reduce network latency. The system may then classify the user in a specified group for providing targeted content.

17 Claims, 6 Drawing Sheets

(56) References Cited

U.S. PATENT DOCUMENTS

| | | | | |
|---|---|---|---|---|
| 10,796,322 | B1 * | 10/2020 | Ramalingam | H04L 47/822 |
| 10,887,426 | B2 * | 1/2021 | Karim | H04L 67/63 |
| 11,461,785 | B2 * | 10/2022 | Redlich | G06Q 30/00 |
| 11,743,345 | B2 * | 8/2023 | Karim | H04L 67/61 |
| 12,468,391 | B2 * | 11/2025 | Drayna | G08B 6/00 |
| 2007/0052552 | A1 | 3/2007 | Suzuki | |
| 2008/0168135 | A1 * | 7/2008 | Redlich | G06F 21/6218 |
| | | | | 709/204 |
| 2010/0250497 | A1 | 9/2010 | Redlich | |
| 2010/0262449 | A1 | 10/2010 | Monteforte | |
| 2011/0251887 | A1 * | 10/2011 | Paul | G06Q 30/02 |
| | | | | 705/14.42 |
| 2013/0215144 | A1 * | 8/2013 | Anzai | G11B 27/034 |
| | | | | 345/619 |
| 2013/0298084 | A1 * | 11/2013 | Spivack | H04L 65/403 |
| | | | | 705/14.67 |
| 2015/0304367 | A1 * | 10/2015 | Chan | H04L 67/306 |
| | | | | 709/204 |
| 2016/0034845 | A1 * | 2/2016 | Hiyama | G06Q 10/02 |
| | | | | 705/7.15 |
| 2017/0243244 | A1 | 8/2017 | Trabelsi | |
| 2018/0288119 | A1 * | 10/2018 | Lee | H04L 67/131 |
| 2019/0019146 | A1 * | 1/2019 | Chraibi | G08G 1/202 |
| 2019/0286928 | A1 * | 9/2019 | Hubschman | G06V 10/96 |
| 2020/0344317 | A1 | 10/2020 | Khalid | |
| 2021/0092201 | A1 | 3/2021 | Khalid | |
| 2021/0192651 | A1 * | 6/2021 | Groth | G06N 3/09 |
| 2021/0258846 | A1 * | 8/2021 | Suthar | H04W 36/12 |
| 2022/0021749 | A1 * | 1/2022 | Wantland | H04L 67/63 |
| 2023/0030397 | A1 * | 2/2023 | Al Majid | G06F 9/451 |
| 2025/0279100 | A1 * | 9/2025 | Maizels | G06V 40/20 |

* cited by examiner

COMPUTING SYSTEM IMPLEMENTING LOCAL CONTEXT RESOLUTION AND EVALUATION FOR NETWORK LATENCY REDUCTION

CROSS REFERENCE TO RELATED APPLICATION

This application is a continuation of U.S. patent application Ser. No. 17/115,239, filed on Dec. 8, 2020; which is a continuation of U.S. patent application Ser. No. 16/393,795, filed on Apr. 24, 2019 (now U.S. Pat. No. 10,887,426), the aforementioned applications being hereby incorporated by reference in their entireties.

BACKGROUND

User-specific data acquisition by network-based application services can create network delay due to remote data calls, such as processing, queuing, and transmission delays. As content targeting becomes increasingly dynamic as well as specific, such network delays can result in missed opportunities in providing a continuous and highly individualized user experience for users of the application service.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
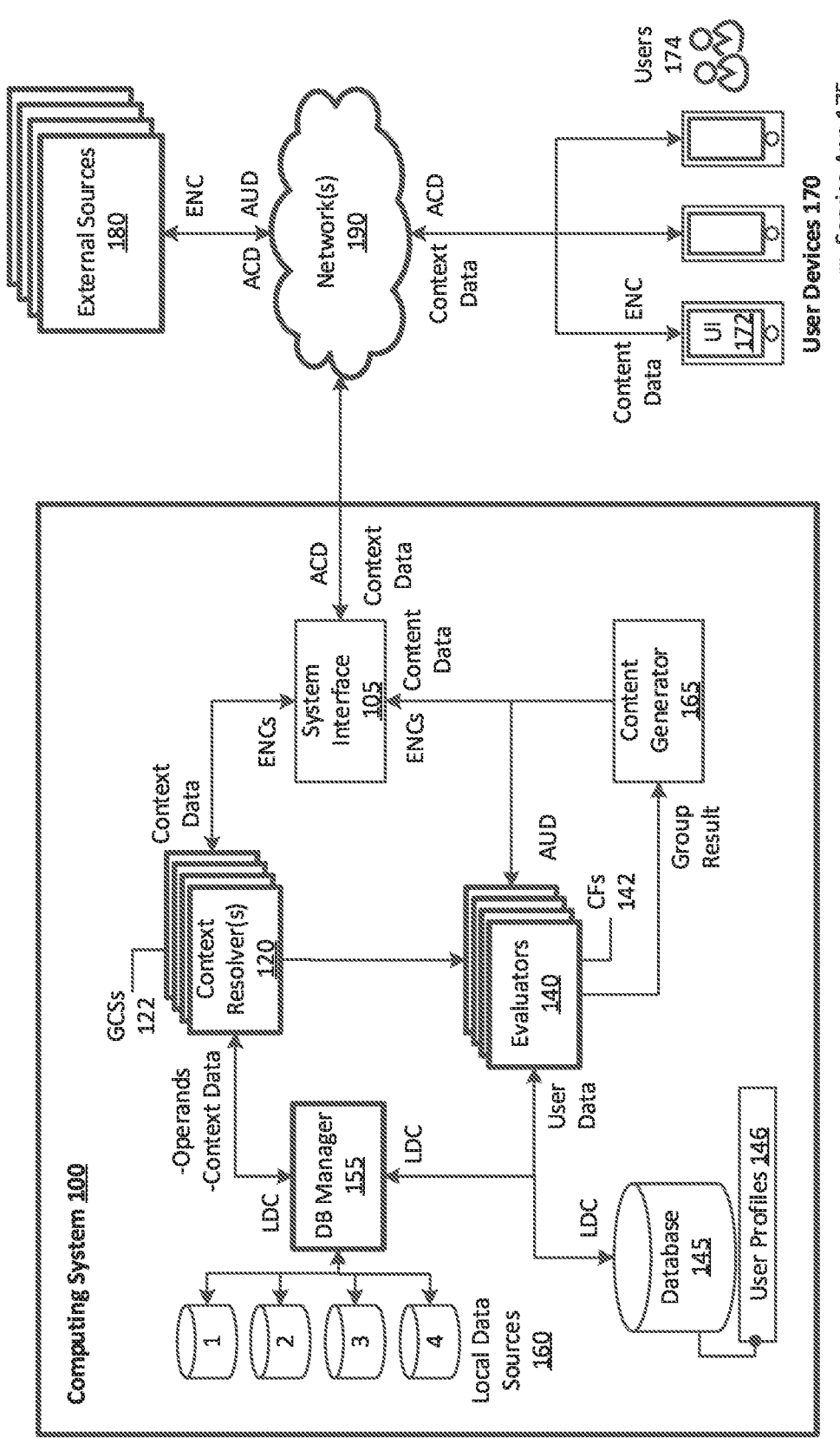
FIG. 1 is a block diagram illustrating an example computing system implementing local priority in context resolution and evaluation of user-specific data for dynamic content targeting, in accordance with examples described herein.

Classifying users (e.g., for content targeting) has typically involved instigating network calls to external data sources to obtain user information, and clustering users based on similarities in the user information. As this clustering becomes increasingly narrow and dynamic classification of users becomes more common and intensive, the evaluation of whether a user belongs to a certain cluster can be constrained by network latency due to the volume of network calls to external data sources.

A network service can be provided to users through a service application executing on the computing devices of the users. In certain examples, such network services can comprise on-demand transport services, such as passenger transport, comestible good delivery, freight transport, on-demand bicycle or scooter services, and the like. In variations, the network service can comprise a social media service, marketplace service, content streaming service, etc. A service entity can coordinate or manage the application service via backend computing systems (e.g., a remote data center), that receive various contextual data from the computing devices of the users. The contextual data can comprise user input data corresponding to user inputs on an application interface generated on a display screen of the user's computing device. The contextual data can further include sensor data and/or location data from sensor and/or positioning system resources on the computing devices of the users. In further aspects, the contextual data can comprise third party data received from third party sources, such as media sources, mapping and/or traffic modeling sources, scheduling or calendar sources, and the like.

For example, the contextual data for a user can indicate the status of the user, such as whether the user is on-app (e.g., currently interacting with the executing application), off-app (e.g., has deactivated the application), and the user's current state while the application is executing. For an on-demand transport service, the state of the user can indicate whether the user is checking marketplace conditions (e.g., estimated times of arrival (ETAs) of proximate drivers, transport prices, etc.), has requested transport, is currently awaiting transport, is currently being transported, is awaiting food item or package delivery, and the like. In various examples, the contextual data can further indicate a session time for the user interacting with the service application, a wait time for transport, changing ETAs of a matched transport provider, the transport provider's route and/or navigation information, the actual marketplace conditions, current pricing data for the network service, etc.

Described herein is a computing system that uses local data sources and/or contextual derivation for classifying users into specified groups in accordance with a prioritization scheme. A group can be defined by a set of constraints that, when evaluated using user-specific data, determine whether a particular user is classified in the group. For example, a group can comprise individuals with some common traits, and/or a common location, which are determined by the computing system to have similar interests, attributes, behaviors, anticipated behaviors, etc., based on the user-specific data available to the system. Such groups can be targeted for content delivery to enhance user experience in connection with an application service.

The user-specific data can comprise contextual data received, over one or more networks, from a computing device of the user. In certain implementations, the service application executing on the computing device can at least partially treat the contextual data and perform local context resolution and/or evaluation, as described herein. In some examples, the contextual data can indicate the user's prior and/or current interactions with an application operating on the computing device of the user, location, status, and the like. Given the contextual data, the computing system can determine whether the set of constraints defining the specified group can be evaluated, or whether additional information (e.g., a remainder set of operands for the set of constraints) is required. When additional information is required, the computing system can execute one or more context resolvers to derive or acquire the additional information. Execution of the context resolvers can cause the computing system to determine whether such information can be derived or acquired locally (e.g., without a network call to an external data source, such as the user's computing device), or whether the information must be acquired through network communications. The context resolvers can prioritize local derivation or acquisition of the additional data.

When the necessary data is acquired and/or derived, the computing system can execute one or more evaluators to determine whether the contextual data of the user—and any additional derived or acquired data—satisfies the set of constraints corresponding to the specified group, and produce an output indicating so. Additionally or alternatively, the execution of the one or more evaluators can be performed to evaluate the contextual data against a particular operator. In certain scenarios, one or more of the evaluators may require remote execution or additional data acquisition (e.g., when certain contextual data of the user has become stale and requires a network call). In such scenarios, the computing system can again prioritize a determination of whether the additional data may be derived or acquired locally. However, if the additional data cannot be derived or acquired locally, then as a fallback option, the evaluator(s) can acquire the additional data through network communications with an external data source. Once all necessary contextual data is acquired and updated, execution of the one or more evaluators can output a determination of whether the user is classified in the group. If the user is classified in the group, the computing system can generate targeted content for the user to, for example, improve the user's experience in interacting with the application service. In variations, the computing system can outsource the evaluation to another service over a network and receive a group result for a user.

Among other benefits, examples described herein achieve a technical effect of classifying users of an applications service using local context resolution and evaluation processes, thereby preempting external network communications and reducing network latency. Furthermore, the examples described herein can employ machine learning techniques to, over time, make the user classification and content delivery processes described herein more robust.

As used herein, a computing device refers to devices corresponding to desktop computers, cellular computing devices and/or smartphones, personal digital assistants (PDAs), laptop computers, virtual reality (VR) or augmented reality (AR) headsets, tablet computing devices, etc., that can provide network connectivity and processing resources for communicating with the system over a network. A computing device can also correspond to custom hardware, in-vehicle devices of automobiles, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating a computing system implementing local priority in context resolution and evaluation of user-specific data for dynamic content targeting. In the below discussion of FIG. 1, the computing system 100 can be included in one or more backend servers or datacenters. Additionally or alternatively, one or more modules and operations described in connection with the computing system 100 of FIG. 1 may be performed locally on the computing device 170 of a user 174 (e.g., via an executing service application 175). Accordingly, while specific operations are described in connection with the logical modules of the computing system 100, one or more of the modules of the computing system 100 can operate on the computing device 170. In various examples, the computing system 100 can implement a network service via a service application 175 executing on the user computing devices 170 of users 174 of the network service. As described herein, the network service can comprise any application-based service that users 174 utilize through interaction with their user computing devices 170, and can include a social media service, marketplace service (e.g., enabling users to buy and/or sell goods), content streaming service, ridesharing service, a property-sharing service, financial transaction service, and the like. In one example of FIG. 1, the computing system 100 can implement an on-demand transport service that matches requesting users 174 with available transport providers.

In various examples, the computing system 100 can communicate, over one or more networks 190, with the service application 175 executing on the user computing devices 170. Execution of the service application 175 on the user computing devices 170 can cause a user interface 172 to be displayed on a display screen of each user computing device 170. The user 174 can interact with the user interface 172 to, for example, check current marketplace conditions (e.g., current delivery or transport price levels), request transport (e.g., delivery of goods or passenger transport), provide driver feedback, make payments, view entertainment content, news, advertising content, and the like.

In various examples, the marketplace conditions of the network service (e.g., supply/demand information for the service in a given region or sub-region), the user interactions with the user interface 172, sensor data from the computing devices 170 (e.g., image data, accelerometer data, audio data, etc.), location data, and various contextual information for each user 174 can comprise contextual data, which can be received over one or more networks 190 by a system interface 105 of the computing system 100.

The contextual data can be processed by the computing system 100 for each user 174. Specifically, the computing system 100 can include a set of context resolvers 120 that can determine whether the context data received from the computing device 170 of a particular user 174 is sufficient to evaluate whether the user 174 can be classified in a particular group, as defined by a group constraint set (GCS 122). In various implementations, each context resolver 120 can correspond to a specific group and a group constraint set 122 (e.g., a constraint function) corresponding to that group. In certain implementations, the group constraint set 122 for a particular group can require a set of operands to execute with the contextual data in order to evaluate whether the user 174 is classified in that particular group. Accordingly, in order perform the evaluation, the context resolver 120 can first determine whether any additional contextual information is required. Additionally or alternatively, the context resolver 120 can determine whether a remainder set of one or more operands (e.g., corresponding to additional necessary contextual data) are required for the evaluation.

If additional contextual information is required, the context resolver 120 can determine whether the additional contextual information can be acquired or derived locally. For example, the computing system 100 can include a number of local data sources 160, which can include dynamic and/or historical data relevant to the user 174. The group constraint set 122 for a particular group may require one or more additional items of contextual information than the contextual data provided by the computing device 170 of the user 174. In certain aspects, the context resolver 120 may derive the additional contextual information based on the current contextual data received from the user computing device 170. For example, local data from the computing device 170 can indicate a heading, direction, and speed of the user 174. The set of constraints and operands for a particular group may require that the user be within a geofenced area, and the current location data may indicate that the user 174 is outside the geofenced area. However, based on the heading, direction, speed, and other information (e.g., routing or road network information), the context resolver 120 can derive that the user 174 will be within the geofenced area within a certain period of time (e.g., thirty seconds).

In further performing contextual resolution, the context resolver 120 can transmit a local data call (LDC) to a local database manager 155, which can process the local data call to identify whether the local data sources 160 contain the additional contextual information need to execute the constraint function defining the particular group. Specifically, the constraint function 142 corresponding to the group constraint set that defines the particular group can include a set of operands upon which to apply the contextual data. In generating the local data call for the local database manager 155, the context resolver 120 can query whether the local data sources 160 contain at least some the additional contextual information. For example, in the context of on-demand transport and ridesharing, the database manager 155 can periodically refresh or cache user data in the local data source 160 specific to the user 174, such as a total number of requested rides (e.g., over a given timeframe), an amount of money or credits expended using the on-demand transport service, account information, the routes taken on the requested rides, previous pickup locations and/or destinations for the requested rides, updated ride preferences or usages (e.g., luxury transport, standard transport, ride-pool, comestible goods delivery, freight service, etc.), a number of application launches or sessions of the service application 175, and the like. In additional examples, the user profile 146 of the user 174 can indicate the user's personal information, such as name, age, sex or gender, home address, work address, computing device make and model, network service provider, profession, application service information (e.g., usage patterns, preferences, interests, etc.), and the like. In certain implementations, the evaluators 140 may identify user information that is stale and attempt to acquire refreshed data (e.g., the user may have moved to a new home or work address, changed professions, etc.) without the use of external network calls The database manager 155 can access the local data sources 160 and/or user profile 146 and can return either all of the additional contextual data needed to satisfy all operands of the constraint function from the local data sources 160, a portion of the required additional contextual data, or an indication that none are included in the local data sources 160. For acquisition of the additional contextual information, the context resolver 120 may prioritize local data derivation and acquisition in order to reduce or minimize the amount of external network calls and communications to external data sources 180, which can include the user's computing device 170 and other data sources (e.g., datacenters of the network service, third-party data sources, etc.). For example, the constraint function can indicate that only users which a particular make and model smartphone, or a particular smart phone operating system, are to be targeted for content, which the context resolvers 120 can attempt to determine from local data sources 160, 145 before transmitting a query over the network 190.

In some examples, if the context resolver 120 is unable to derive or acquire the necessary additional contextual information locally, then the context resolver 120 can abandon the operation for that particular group (e.g., enter an error message for the evaluator(s) 140 that process(es) the constraint function for the group). In variations, when the context resolver 120 is unable to derive or acquire the necessary additional contextual information locally, the context resolver 120 can generate and transmit an external network call to one or more external data sources 180 and/or the user's computing device 170 for the additional contextual data (ACD). Once all necessary contextual data for the constraint function is acquired, the context resolver 120 can provide the contextual data and operands as a data package for the relevant evaluators 140, as described below. It is contemplated that all context resolvers 120 can operate based on the received contextual data, and can simultaneously attempt or prioritize local context resolution. In doing so, the context resolvers 120 can significantly reduce the amount of network queries transmitted over the network 190, thereby reducing network latency.

In the context of on-demand transport services, the computing system can include a content generator 165 that functions to provide targeted content to the computing device 170 of the user 174 (e.g., via the service app 175) based on the group(s) to which the user 174 belongs. The targeted content can comprise thematic content based on the user's determined preferences (e.g., as determined by the group classifications of the user 174), content to improve the user's experience with respect to the on-demand transport service, special offers or bonuses (e.g., a free trip), suggested trips or destinations, and/or targeted advertising content.

According to examples described herein, when all necessary and updated contextual information to satisfy or include all operands of the constraint function 142 are derived and/or acquired, a set of relevant evaluators 140 can attempt to process the constraint function 142 in accordance with an additional prioritization process that prioritizes local evaluation. As provided herein, the relevant evaluators 140 can determine or indicate whether local processing of the constraint function 142 using the operands and contextual data is possible. If so, the evaluators 140 can process the constraint function 142 to return a result indicating whether the user 174 is classified in the corresponding group.

However, if local evaluation is not possible (e.g., additional contextual data is needed), then the evaluators 140 can perform one or more non-local actions to generate or receive the group result. In one example, the evaluators 140 can simply return an error result indicating that local evaluation was not possible. In variations, the evaluators 140 can externalize the evaluation resolution process by generating and transmitting an external network call to the external sources 180 or the user device 170 over the network 190 (e.g., for the necessary additional user data).

In some examples, the evaluators 140 can process the constraint function 142 using the contextual data, and generate a group result accordingly. It is contemplated that the context resolvers 120 and evaluators 140 can operate on contextual data from any or all users 174 of the application service at any given time. For example, the context resolvers 120 and evaluators 140 can operate on contextual data in response to detecting a launch of the service application 175 on the computing device 170 of the user 174. It is further contemplated that a constraint function comprising a group constraint set 122 that includes a set of operands can be constructed for any number of groups. Each of these groups can be based on content to be targeted to that particular group. As described, the content can comprise user experience content on a user interface 172 of the service application 175 (e.g., custom or individualized themes for the group, user interface elements, special offers corresponding to user retention efforts, advertising content, and the like).

In variations, when additional user data is needed for evaluation, the evaluators 140 can execute a network call to outsource the evaluation to an external source and receive a group result. For example, the evaluators 140 can transmit the contextual data it currently possesses to the external source over the networks(s) 190 with an evaluation request. The external source may then execute a corresponding constraint function on the contextual data and return a group result of the evaluation.

The local evaluators 140 and/or external source can evaluate the set of constraints using the contextual data, the acquired or remainder set of operands, and any of the additional data corresponding to the user 174 to determine whether the user 174 is classified in the specified group. When the evaluators 140 determine that the user 174 qualifies as a member of the group corresponding to the constraint function 142, the evaluators 140 can provide a group result indicating whether the user 174 belongs to the group to the content generator 165. The content generator 165 can push or otherwise transmit group-specific, targeted content data to group members of the network 190. As described herein, the content generator 165 can push content items dynamically for each user 174. For example, the user 174 can enter a particular geofenced area that comprises one of the constraints of a constraint function 142 defining a specified group that is to receive a targeted offer for a transport service. In response to the context resolvers 120 and evaluators 140 indicating that the current contextual data of the user 174 satisfies the constraint function 142, the content generator 165 can transmit content or display data indicating the targeted offer to the computing device 170 of the user 174. Based on the received content data, the user interface 172 of the service application 175 can the display a group-specific user interface element indicating the targeted offer.

In performing the techniques described herein, the computing system 100 of FIG. 1 can maximize the engagement of its users 174 while increasing positive user experience and seeking to eliminate or minimize negative user experiences with the application service. As provided herein, the computing system 100 can be implemented in connection with an on-demand transport service, but can also be implemented in connection with any application service, such as a social media service, content provider service, financial service, marketplace service (e.g., buying and selling goods), and the like. For on-demand transport service implementations, the computing system 100 can apply the content targeting techniques dynamically as user's 174 interact with the service application 175. In prioritizing local context resolution and evaluation techniques, the computing system 100 can become more and more robust over time, identifying specific data for the database manager 155 to cache or remove, and severely reducing the need for external network interactions, thereby reducing network latency.

Computing Device

Figure 2:
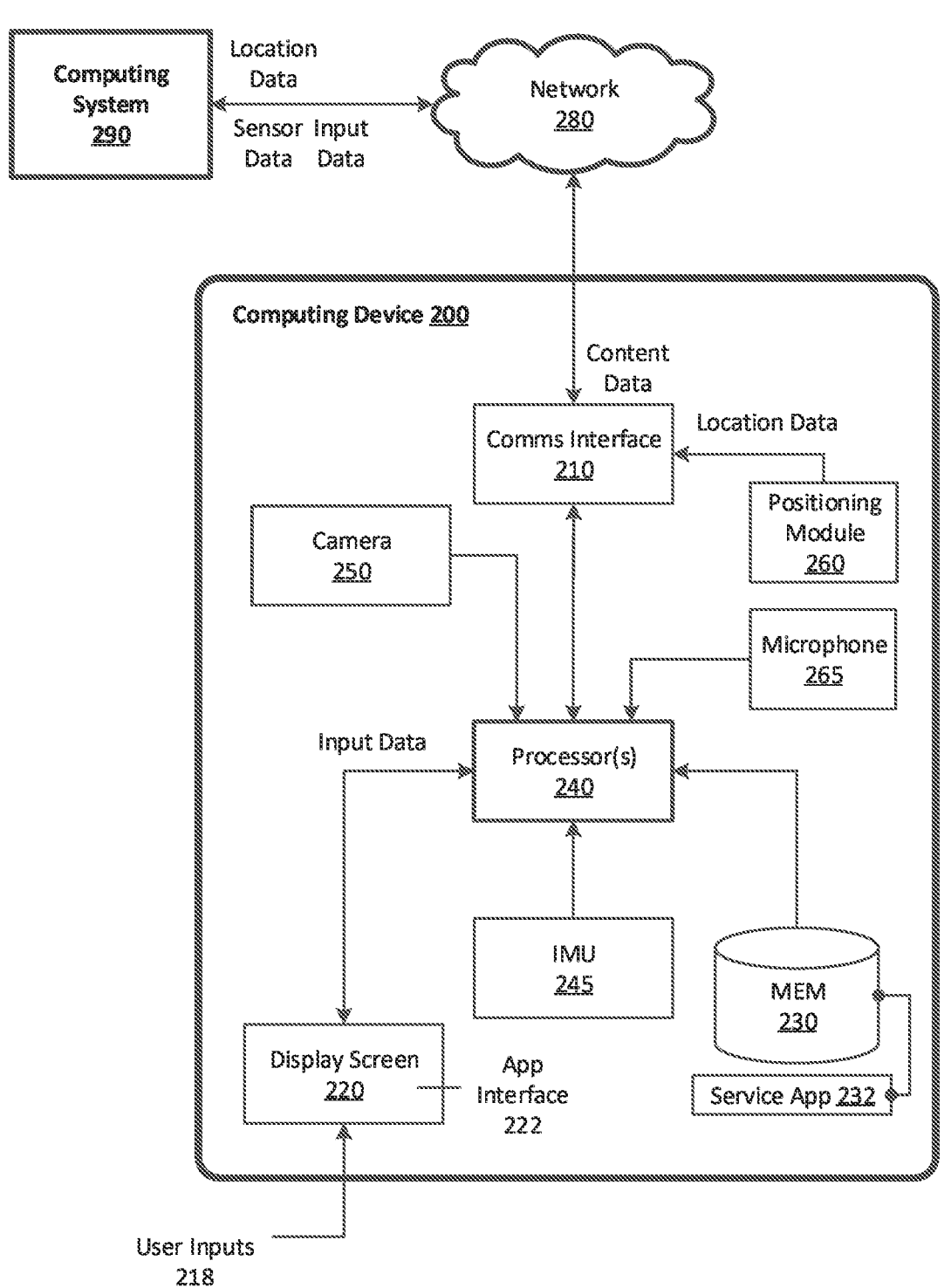
FIG. 2 depicts an example computing device utilized by users of an application service, according to examples described herein.

FIG. 2 depicts an example computing device utilized by users of an application service (e.g., requesting users 174 and transport providers 180 as shown in FIG. 1), according to examples described herein. In many implementations, the computing device 200 can comprise a mobile computing device, such as a smartphone, tablet computer, laptop computer, VR or AR headset device, and the like. As such, the computing device 200 can include typical telephony features such as a microphone 265, a camera 250, an inertial measurement unit (IMU) 245, and a communication interface 210 to communicate with external entities using any number of wireless communication protocols. In certain aspects, the computing device 200 can store a designated application (e.g., a service app 232) in a local memory 230. In variations, the memory 230 can store additional applications executable by one or more processors 240 of the computing device 200, enabling access and interaction with one or more host servers over one or more networks 280.

In response to a user input 218, the service app 232 can be executed by a processor 240, which can cause an app interface 222 to be generated on a display screen 220 of the computing device 200. The app interface 222 can enable the user to, for example, scroll through content for a network-based service, such as a social media service, marketplace or shopping service, content streaming service, etc. For on-demand transport services, the app interface 222 can further enable the user to select from multiple service types, such as a carpooling service, a regular ride-sharing service, a professional ride service, a van or high-capacity vehicle transport service, a luxurious ride service, and the like.

The user can generate a transport request via user inputs 218 provided on the app interface 222. For example, the user can select a service location, view the various service types and estimated pricing, and select a particular service type (e.g., for transportation to an inputted destination). As provided herein, the service application 232 can further enable a communication link with a network computing system 290 over the network 280, such as the computing system 100 as shown and described with respect to FIG. 1.

The processor 240 can transmit the transport requests via a communications interface 210 to the backend computing system 290 over a network 280. In response, the computing device 200 can receive confirmations from the computing system 290 indicating a selected transport provider that will fulfill the transport request and rendezvous with the user at a rendezvous location. In various examples, the computing device 200 can further include a positioning module 260 (e.g., GPS receiver), which can provide location data indicating the current location of the requesting user to the computing system 290 to, for example, establish the rendezvous location and/or select an optimal transport provider to fulfill the transport request.

The computing device 200 can further be utilized by the computing system 290 to receive sensor data (e.g., audio data, accelerometer data, image data, etc.) and input data corresponding to the user's interactions with the app interface 222. These inputs can include providing driver feedback and/or a driver rating for a transport provider, making payment for rides or deliveries, configuring a transport request, scrolling content (e.g., offers, or map content to view supply-demand information), and the like. Such data, along with the location data, can comprise contextual data received and processed by the computing system 290 to perform context resolution and group evaluation techniques described herein.

Methodology

In the below discussion of the flow charts described with respect to FIGS. 3, 4A, and 4B, reference may be made to reference characters representing like features as shown and described with respect to FIGS. 1 and 2. Furthermore, the processes described in connection with FIGS. 3, 4A, and 4B may be performed by an example computing system 100, 290 implementing the techniques described with respect to FIGS. 1 and 2.

Figure 3:
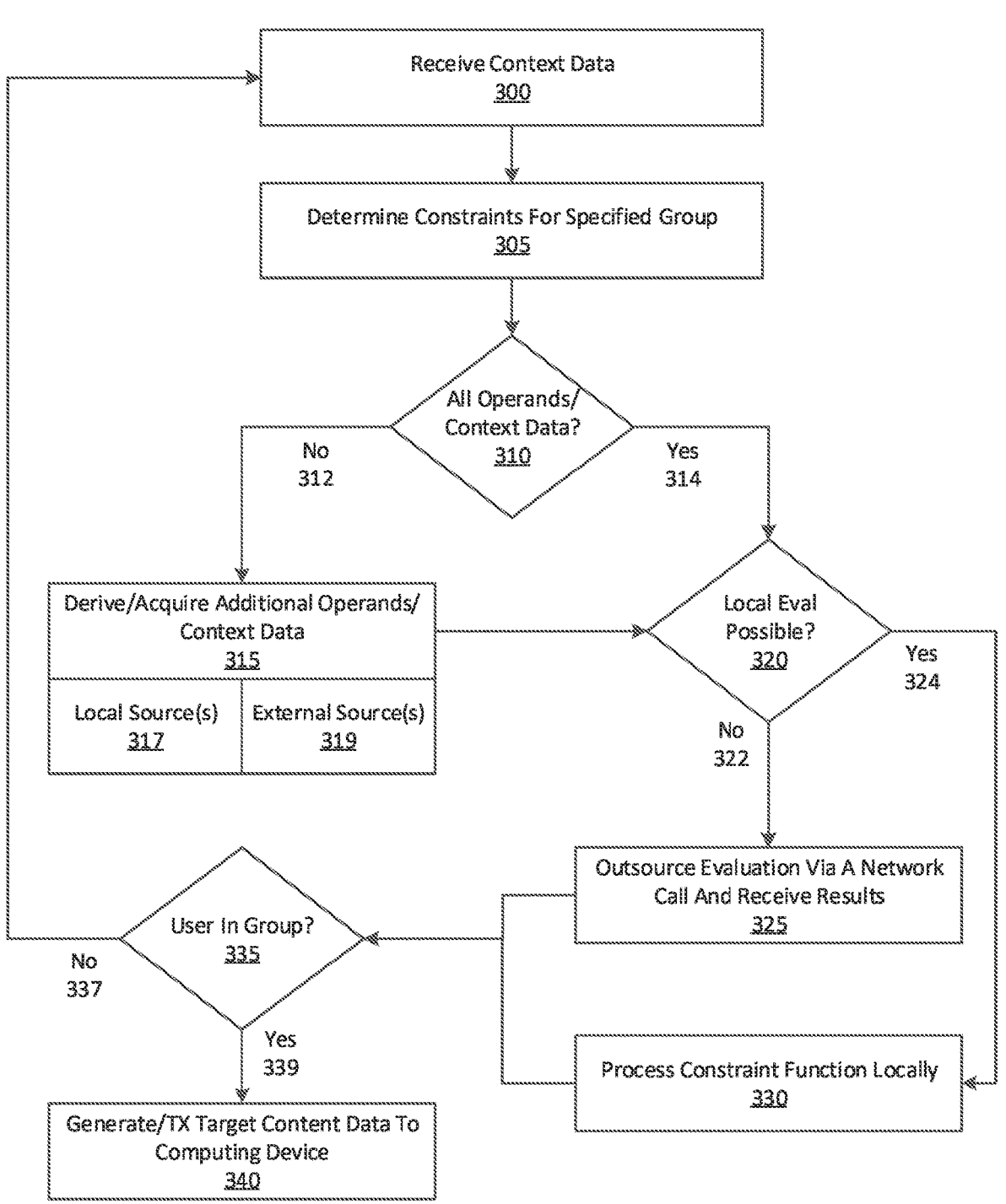
FIG. 3 is a flow chart describing an example method of implementing local priority in context resolution and evaluation of user-specific data for dynamic content targeting for an application service, according to examples described herein.

FIG. 3 is a flow chart describing an example method of implementing local priority in context resolution and evaluation of user-specific data for dynamic content targeting for an application service, according to examples described herein. Referring to FIG. 3, a computing system 100 can receive contextual data corresponding to a user 174 (300). For example, the computing system 100 can receive the contextual data from an external datacenter of an application service, and/or from a computing device 170 of a user 174 of the application service (300). Based on the contextual data. the computing system 100 can determine a set of constraints for a specified group (305). The computing system 100 may then determine whether all operands and/or contextual data for the set of constraints are present (310). If so (314), then the computing system 100 can proceed straight to determining whether the contextual data can be evaluated locally (e.g., whether all necessary evaluators 140 are local to process the constraint function 142) (320).

However, if all operands and/or contextual data are not present (312), then the computing system 100 can derive and/or acquire the necessary additional operands or contextual data (315). In various examples, the computing system 100 can prioritize derivation and/or acquisition from local sources 160, as described herein (317). In such examples, if the computing system 100 is unable to acquire the necessary additional operands and/or contextual data locally, the computing system 100 can acquire the operands and/or data from one or more external sources (319). Once all necessary contextual data and operands are present, the computing system 100 may then determine whether the contextual data can be evaluated locally (e.g., whether all necessary evaluators 140 are local to process the constraint function 142) (320). If so (324), then the computing system 100 can process the constraint function 142 (330), and determine whether the user 174 is classified in the group (335).

However, if all necessary evaluators 140 are not local (322), then the computing system 100 can outsource the evaluation via a network call to an external source and receive the group result (325). Specifically, the computing system 100 can transmit the contextual data to the external source with an evaluation request, which can remotely process the constraint function 142, and return a group result indicating whether the user 174 is classified in the group corresponding to the constraint function 142.

If execution of the constraint function results in the user 174 being classified in the group (339), then the computing system 100 can generate and transmit group-specific content data to the computing device 170 of the user 174 (340). However, if the user 174 is not in the group (337), then the computing system 100 can continue to receive context data corresponding to the user 174 and dynamically repeat the process for the particular group and constraint function 142. It is contemplated that the contextual resolution and evaluation process described with respect to FIG. 3 may be performed simultaneously for any number of groups and corresponding constraint functions. Accordingly, targeted content for multiple groups can be transmitted to the user device 170 when the user 174 qualifies for multiple groups. In variations, to avoid content clutter, certain group-specific content may be prioritized by the content generator 165 over lower priority content.

Figure 4A:
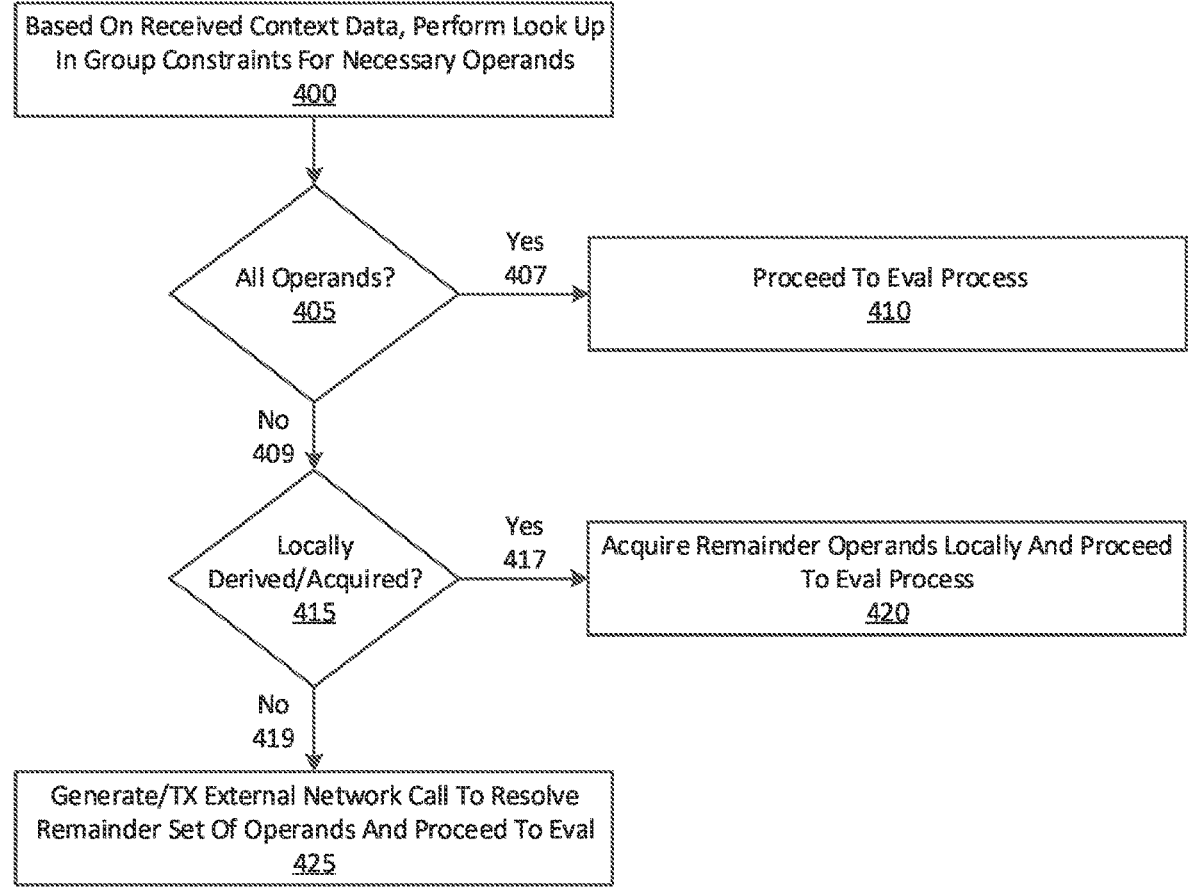
FIG. 4A is a flow chart describing an example method of prioritizing local derivation and/or acquisition for context resolution of user-specific data in connection with an application service, according to examples described herein.

FIG. 4A is a flow chart describing an example method of prioritizing local derivation and/or acquisition for context resolution of user-specific data in connection with an application service, according to examples described herein. Referring to FIG. 4A, the computing system 100 can perform a lookup in a group constraint set for all necessary operands based on received context data corresponding to the user 174 (400). The computing system 100 can determine whether all operands are present for execution of the constrain function defining a group (405). If so (407), then the computing system 100 can proceed to the evaluation process described with respect to FIG. 4B. However, if not (409), then the computing system 100 determine whether the necessary operands, or contextual data corresponding to the operands, can be acquired or derived locally (415). For example, the computing system 100 can acquire all relevant context resolvers 120 to derive or acquire the additional necessary operands.

If the necessary operands are not able to be derived or acquired locally (419), the computing system 100 can generate and transmit an external network call to resolve and/or acquire the remainder set of operands and proceed to the evaluation process (425). However, if the necessary operands are able to be derived or acquired locally (417), then the computing system 100 can proceed directly to the evaluation process, as described herein (420).

Figure 4B:
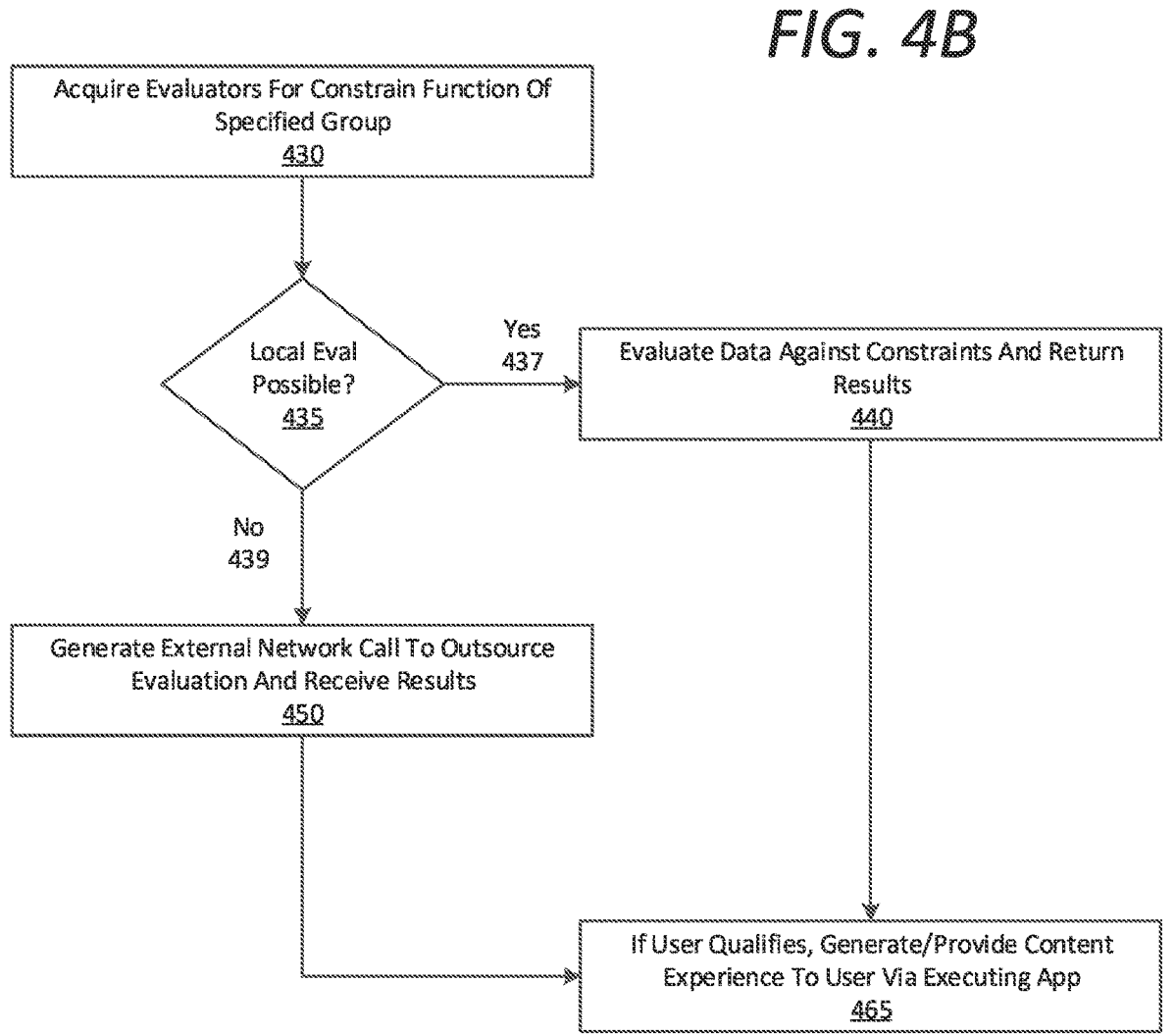
FIG. 4B is a flow chart describing an example method of prioritizing local evaluation of contextual data in connection with an application service, according to examples described herein.

FIG. 4B is a flow chart describing an example method of prioritizing local evaluation of contextual data for in connection with an application service, according to examples described herein. Referring to FIG. 4B, the computing system 100 acquire the relevant evaluators 140 for the constraint function 142, corresponding to a set of constraints, for a specified group (430). The computing system 100 can further determine whether local evaluation is possible (e.g., whether all necessary evaluators 140 are local) (435). If so (437), then the computing system 100 can evaluate the constraint function 142 using the existing data can return the result indicating whether the user 174 is classified in the particular group (440). However, if local evaluation is not possible (437), then the computing system 100 can generate an external network call to outsource the evaluation to an external source and receive the group result (450).

In various implementations, if the user qualifies, then the computing system 100 can generate and provide group-specific content to the computing device 170 of the user 174 (e.g., via the executing service application 175) (465). It is contemplated that the local prioritization techniques with respect to context resolution and constraint evaluation can significantly improve network latency in, for example, application service servers and/or datacenters. Furthermore, the computing system 100 can identify data and/or data types for local caching (e.g., data or data types that require numerous external network calls). Over time, the computing system 100 can become increasingly more robust, requiring fewer and fewer network communications, and streamlining user clustering and content targeting.

Hardware Diagram

Figure 5:
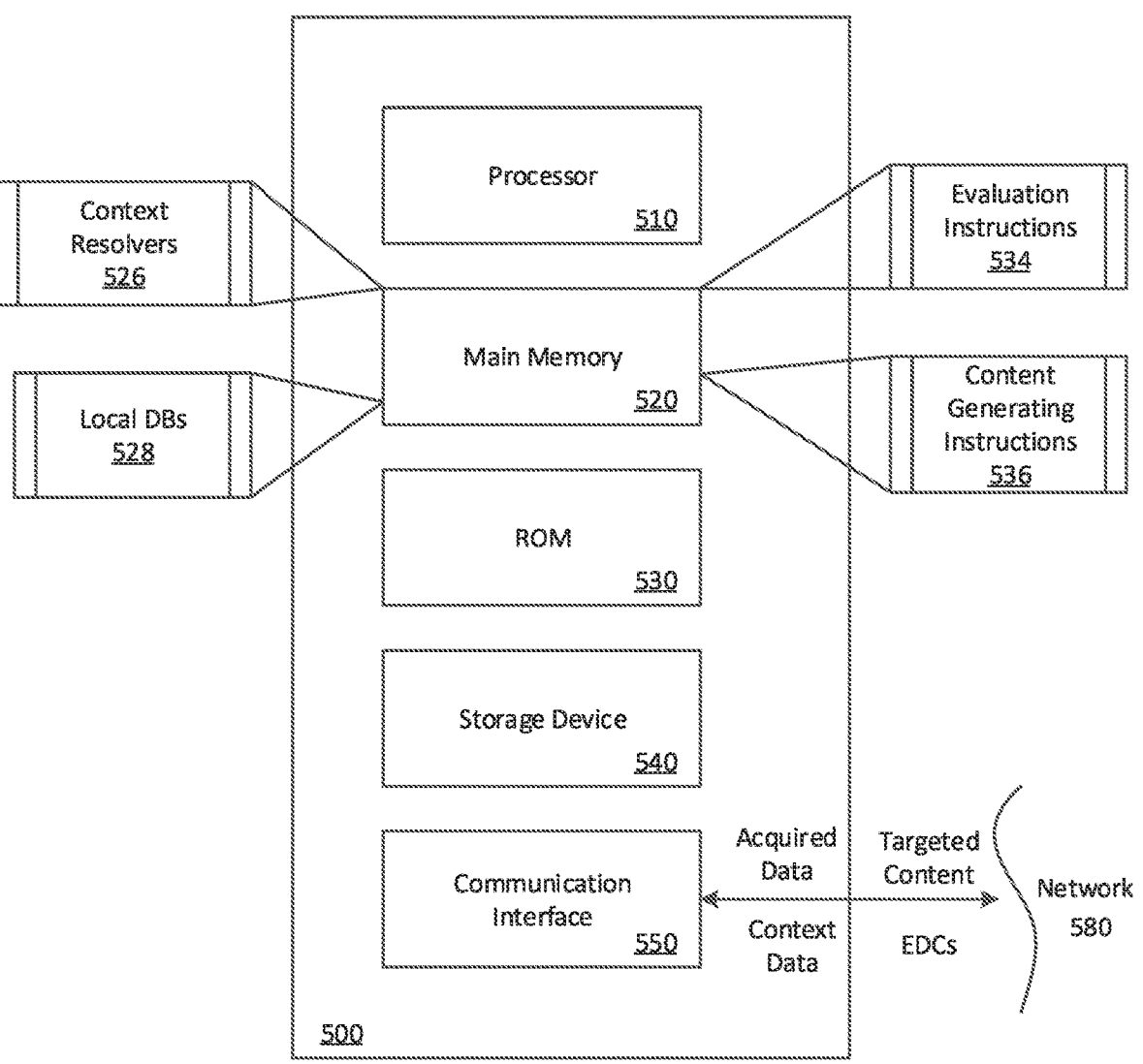
FIG. 5 is a block diagram that illustrates a computing system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service for providing transportation services throughout a given region (e.g., a metropolitan area). In variations, the computer system 500 can be implemented as part of an application-specific service, such as a social media service, shopping or marketplace service, content streaming service, and the like. In the context of FIGS. 1 and 2, the computing system 100, 290 may be implemented using a computer system 500 such as described by FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate over one or more networks 580 (e.g., cellular network) through use of the network link (wireless or wired). Using the network link, the computer system 500 can communicate with one or more computing devices and one or more external servers. In accordance with examples, the computer system 500 can receive contextual data from users of the network service. The executable instructions stored in the memory 530 can include context resolution instructions 526 comprising a plurality of context resolvers, which the processor 510 executes to prioritize local contextual resolution for a given set of constraints corresponding to a group, as described herein. The instructions can further include evaluation instructions 534 comprising a plurality of evaluators, which the processor 510 can execute to prioritize local evaluation of constraint functions corresponding to respective groups, as described herein. The instructions may further include content generating instructions 536, which the processor 510 can execute to generate targeted, group-specific content to group members as determined by the evaluators.

The processor 510 is configured with software and/or other logic to perform one or more processes, steps and other functions described with implementations, such as described with respect to FIGS. 1-5, and elsewhere in the present application. Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:
a network communication interface;

one or more processors; and one or more memory resources storing instructions that, when executed by the one or more processors, cause the one or more processors to:

detect, based on data received via the network communication interface, a launch of a service application on a computing device of a user to initiate an application session;

during the application session, obtain, via the network communication interface, contextual data corresponding to user interactions with the service application by the user;

based on the contextual data, derive additional user data associated with the contextual data; based at least in part on deriving the additional user data, classify the user in multiple specified groups for providing targeted content, wherein the user is classified in each group of the multiple specified groups based at least in part on one of the contextual data or the additional user data to determine whether a set of constraints corresponding to each group of the multiple specified groups in satisfied;

determine a level of priority for the targeted content of each specified group that the user is classified in based at least on the set of constraints corresponding to each specified group; and provide the targeted content of at least one group of the multiple specified groups to the user based on the level of priority for the targeted content of the at least one group.

2. The computing system of claim 1, wherein the executed instructions further cause the computing system to:

subsequent to deriving the additional user data, determine whether second additional user data is required to satisfy a set of constraints associated with the multiple specified groups; and based on determining that second additional user data is required to satisfy the set of constraints, perform a network call to an external data source to acquire the second additional user data.

3. The computing system of claim 2, wherein the executed instructions further cause the computing system to:

determine that evaluation of at least one of the contextual data or the additional user data cannot be performed locally;

generate and transmit an evaluation request, using the network communication interface, to an external source to evaluate the set of constraints using the contextual data; and receive, via the communication interface, a group result from the external source indicating that the user is classified in each group of the multiple specified groups.

4. The computing system of claim 1, wherein the executed instructions further cause the computing system to:

in response to determining that the user is classified in each group of the multiple specified groups, transmit, via the network communication interface, display data to the computing device of the user, the display data causing the computing device to generate the targeted content, specific to each group of the multiple specified groups, on a user interface displayed on a display screen of the computing device of the user.

5. The computing system of claim 4, wherein the targeted content is displayed via the service application on the computing device of the user.

6. The computing system of claim 5, wherein the targeted content corresponds to an improvement in interactive user experience by the user in interacting with the service application.

7. A non-transitory computer readable medium storing instructions that, when executed by one or more processors of a computing system, cause the computing system to:

detect, based on data received via a network communication interface, a launch of a service application on a computing device of a user to initiate an application session;

during the application session, obtain, via the network communication interface, contextual data corresponding to user interactions with the service application by the user;

based on the contextual data, derive additional user data associated with the contextual data; based at least in part on deriving the additional user data, classify the user in multiple specified groups for providing targeted content wherein the user is classified in each group of the multiple specified groups based at least in part on one of the contextual data or the additional user data to determine whether a set of constraints corresponding to each group of the multiple specified groups in satisfied;

determine a level of priority for the targeted content of each specified group that the user is classified in based at least on a set of constraints associated with each specified group; and provide the targeted content of at least one group of the multiple specified croups to the user based on the level of priority for the targeted content of the at least one group.

8. The non-transitory computer readable medium of claim 7, wherein the executed instructions further cause the computing system to:

subsequent to deriving the additional user data, determine whether second additional user data is required to satisfy a set of constraints associated with the multiple specified groups; and based on determining that second additional user data is required to satisfy the set of constraints, perform a network call to an external data source to acquire the second additional user data.

9. The non-transitory computer readable medium of claim 8, wherein the executed instructions further cause the computing system to:

determine that evaluation of at least one of the contextual data or the additional user data cannot be performed locally;

generate and transmit an evaluation request, using the network communication interface, to an external source to evaluate the set of constraints using the contextual data; and receive, via the communication interface, a group result from the external source indicating that the user is classified in each group of the multiple specified groups.

10. The non-transitory computer readable medium of claim 7, wherein the executed instructions further cause the computing system to:

in response to determining that the user is classified in each group of the multiple specified groups, transmit, via the network communication interface, display data to the computing device of the user, the display data causing the computing device to generate the targeted content, specific to each group of the multiple specified groups, on a user interface displayed on a display screen of the computing device of the user.

11. The non-transitory computer readable medium of claim 10, wherein the targeted content is displayed via the service application on the computing device of the user.

12. The non-transitory computer readable medium of claim 11, wherein the targeted content corresponds to an improvement in interactive user experience by the user in interacting with the service application.

13. A computer-implemented method of network latency reduction, the method being performed by one or more processors of a computing system and comprising:

detecting, based on data received via a network communication interface, a launch of a service application on a computing device of a user to initiate an application session;

during the application session, obtaining, via the network communication interface, contextual data corresponding to user interactions with the service application by the user;

based on the contextual data, deriving additional user data associated with the contextual data to avoid a network call and reduce network latency;

based at least in part on deriving the additional user data, classifying the user in multiple specified group groups for providing targeted content, wherein the user is classified in each group of the multiple specified groups based at least in part on one of the contextual data or the additional user data to determine whether a set of constraints corresponding to each group of the multiple specified groups in satisfied;

determining a level of priority for the targeted content of each specified group that the user is classified in based at least on a set of constraints associated with each specified group; and providing the targeted content to the user of at least one group of the multiple specified groups to the user based on the level of priority for the targeted content of the at least one group.

14. The computer-implemented method of claim 13, further comprising:

subsequent to deriving the additional user data, determining whether second additional user data is required to satisfy a set of constraints associated with the multiple specified groups; and based on determining that second additional user data is required to satisfy the set of constraints, performing a network call to an external data source to acquire the second additional user data.

15. The computer-implemented method of claim 14, further comprising:

determining that evaluation of at least one of the contextual data or the additional user data cannot be performed locally;

generating and transmitting an evaluation request, using the network communication interface, to an external source to evaluate the set of constraints using the contextual data; and receiving, via the communication interface, a group result from the external source indicating that the user is classified in each group of the multiple specified groups.

16. The computer-implemented method of claim 13, wherein the method further comprises:

in response to determining that the user is classified in each group of the multiple specified groups, transmitting, via the network communication interface, display data to the computing device of the user, the display data causing the computing device to generate the targeted content, specific to each group of the multiple specified groups, on a user interface displayed on a display screen of the computing device of the user.

17. The computer-implemented method of claim 16, wherein the targeted content is displayed via the service application on the computing device of the user.

* * * * *